US007802301B1

(12) United States Patent
Dreyer et al.

(10) Patent No.: US 7,802,301 B1
(45) Date of Patent: Sep. 21, 2010

(54) SPYWARE SCANNING AND CLEANING METHODS AND SYSTEM

(75) Inventors: Ross N. Dreyer, Natick, MA (US); Geoffrey B. Grindrod, Santa Clara, CA (US)

(73) Assignee: Trend Micro, Inc., Tokyo (JP)

( * ) Notice: Subject to any disclaimer, the term of this patent is extended or adjusted under 35 U.S.C. 154(b) by 1319 days.

(21) Appl. No.: 11/298,305

(22) Filed: Dec. 9, 2005

Related U.S. Application Data

(60) Provisional application No. 60/635,101, filed on Dec. 10, 2004.

(51) Int. Cl.
*G06F 21/00* (2006.01)
(52) U.S. Cl. ........................................... 726/24
(58) Field of Classification Search ............ 726/22–24, 726/25
See application file for complete search history.

(56) References Cited

U.S. PATENT DOCUMENTS

| | | | | |
|---|---|---|---|---|
| 6,301,668 B1 * | 10/2001 | Gleichauf et al. | ............. | 726/25 |
| 6,324,647 B1 * | 11/2001 | Bowman-Amuah | .......... | 726/23 |
| 7,085,934 B1 * | 8/2006 | Edwards | ...................... | 726/24 |
| 7,536,452 B1 * | 5/2009 | Cao et al. | .................... | 709/223 |

* cited by examiner

*Primary Examiner*—Gilberto Barron, Jr.
*Assistant Examiner*—Samson B Lemma
(74) *Attorney, Agent, or Firm*—Beyer Law Group LLP

(57) ABSTRACT

In a digital computing environment, an improvement to a method of scanning for and removing spyware, includes periodically detecting a current usage level of CPU and disk resources to generate a current usage level signal. In response to the current usage level signal, a rate of scanning for and removing spyware is modulated, based on CPU and disk resource usage from a first time period to a second time period. The scanning for and removing spyware does not substantially interfere with a user's employment of the digital computing environment.

10 Claims, 3 Drawing Sheets

SPYWARE SCANNING AND CLEANING METHODS AND SYSTEM

CITATION OF RELATED APPLICATION

The present application for patent claims the priority of commonly owned Provisional Application for U.S. Patent Ser. No. 60/635,101 filed on Dec. 10, 2004, entitled "Spyware Scanning and Cleaning Methods and Systems."

FIELD OF THE INVENTION

The present relates generally to methods, systems and devices adapted for use in personal computing (PC) and other computing systems to detect and remove "spyware", and, in particular, relates to such methods, systems and devices adapted to detect and remove spyware without interrupting the work of a human user concurrently employing the computer system.

BACKGROUND OF THE INVENTION

The existence, rapid dissemination and pervasiveness of software intended to surreptitiously monitor and report back on a computer user's activities, passwords, and/or other sensitive and private information ("spyware") is a major and growing problem for users of personal computers (PCs) and other computing platforms. At present, a number of tools and software programs have been offered in an attempt to provide spyware removal capability. At present, however, all share the same limitation of negatively affecting the user's ability to productively employ the computer "desktop" or other computer resources while the anti-spyware tool is scanning and cleaning the desktop. Put simply, conventional spyware scanning and removing tools employ too much computer resource at one time to enable the user to continue working without interruption in the computing environment. Instead, the user of a conventional spyware scanning and removal tool must stop working and allow the spyware scan to execute and complete before the user can return to other work.

It would therefore be desirable to provide spyware detection, scanning and removal methods, systems and tools that would enable detection, scanning and removal of spyware without significant interruption to a user's computing activities.

It would also be desirable to provide such methods, systems and tools that could execute in a "background" mode without substantially affecting "foreground" computing activities.

It would further be desirable to provide such methods, systems and tools that are simple and efficient to use, and easily adaptable to a wide range of computing platforms, including PCs and others.

SUMMARY OF THE INVENTION

The present invention provides spyware detection, scanning and removal methods, systems and tools, that enable such detection, scanning and removal without significantly interrupting or negatively affecting the user's ability to productively utilize the desktop while the anti-spyware tool is scanning and cleaning the desktop and/or other aspects of the computing environment.

Additional detail of embodiments and practices in accordance with the present invention will next be set forth in connection with the attached drawings.

DETAILED DESCRIPTION OF THE INVENTION

The present invention provides methods, systems, and components for detecting, in real-time, various levels of computer usage, and modulating the amount of computer resources consumed by the spyware scanning and cleaning process based upon this usage.

Computer viruses, worms, Trojans, and spyware are examples of malicious codes that have plagued computer systems throughout the world. Although there are technical differences between each type of malicious code, malicious codes may be collectively referred to herein as "viruses". For example, commercially available antivirus software is designed to scan a computer for viruses as well as worms and other malicious codes. Alternatively, malicious codes may be collectively referred to as "spyware".

In one embodiment of the invention, a real-time computer usage modulation method is provided in an enterprise anti-spyware product. This method involves (1) periodically polling all processes currently running on a desktop for incremental central processor time and disk usage, (2) computing a usage threshold and (3) applying the threshold to the scanning and cleaning process of the anti-spyware product.

Each parameter used in this method can be set to allow the anti-spyware product to use varying amounts of computer resources depending upon the environment it is deployed in. Some environments are more sensitive to CPU and disk usage by background tools than others.

Before proceeding with additional detail of embodiments and practices of the present invention, the following is a brief discussion of the typical aspects of a computing environment in which the invention may be implemented.

Figure 1:
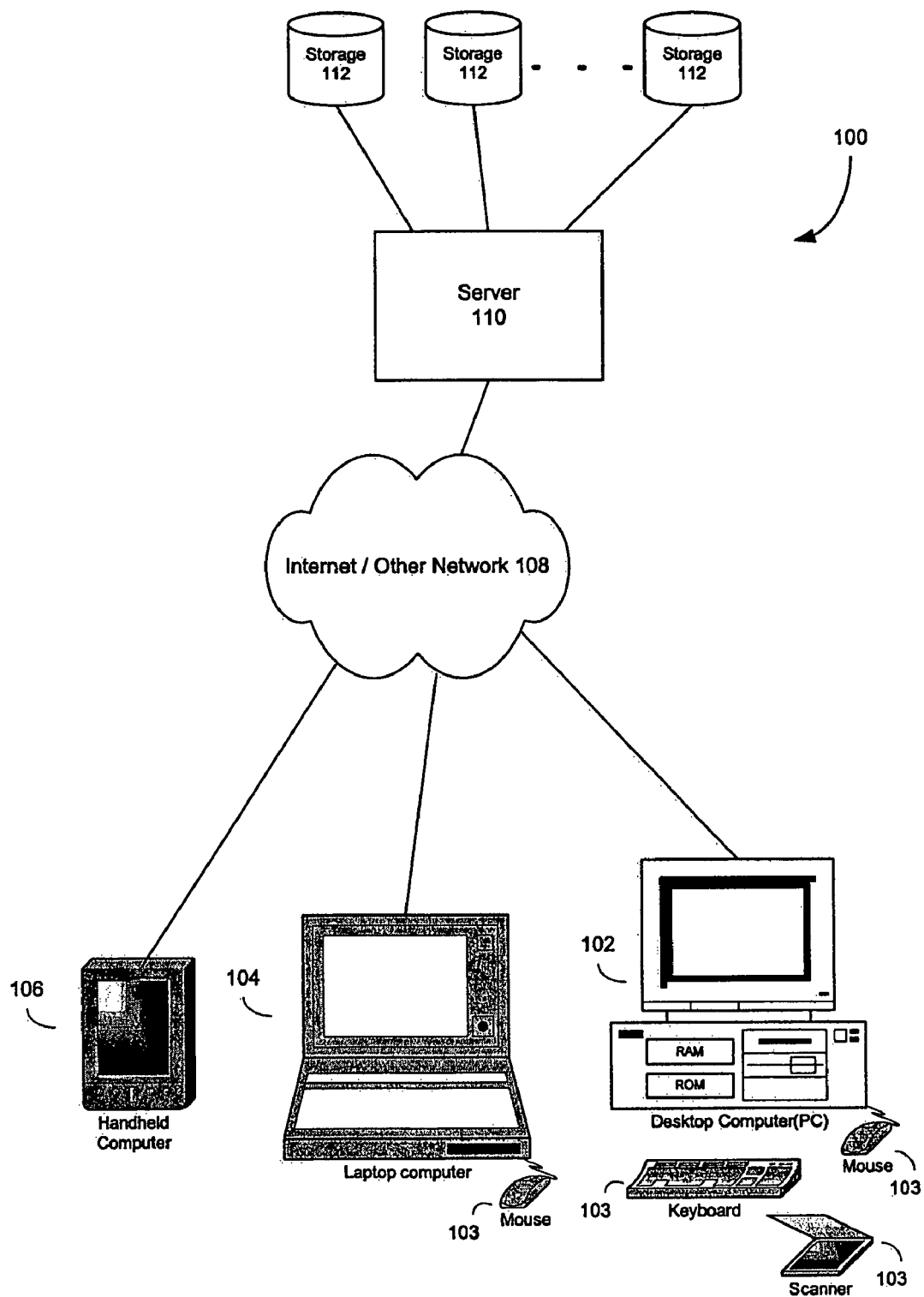
FIG. 1 is a schematic diagram of a conventional digital processing system in which the present invention can be deployed.

In particular, methods, devices or software products in accordance with the invention can operate on any of a wide range of conventional computing devices and systems, like those depicted by way of example in FIG. 1 (e.g., a network system 100), whether standalone, networked, portable or fixed, including conventional PCs 102, laptops 104, handheld or mobile computers 106, or across the Internet or other networks 108, which may in turn include servers 110 and storage 112.

Figure 2:
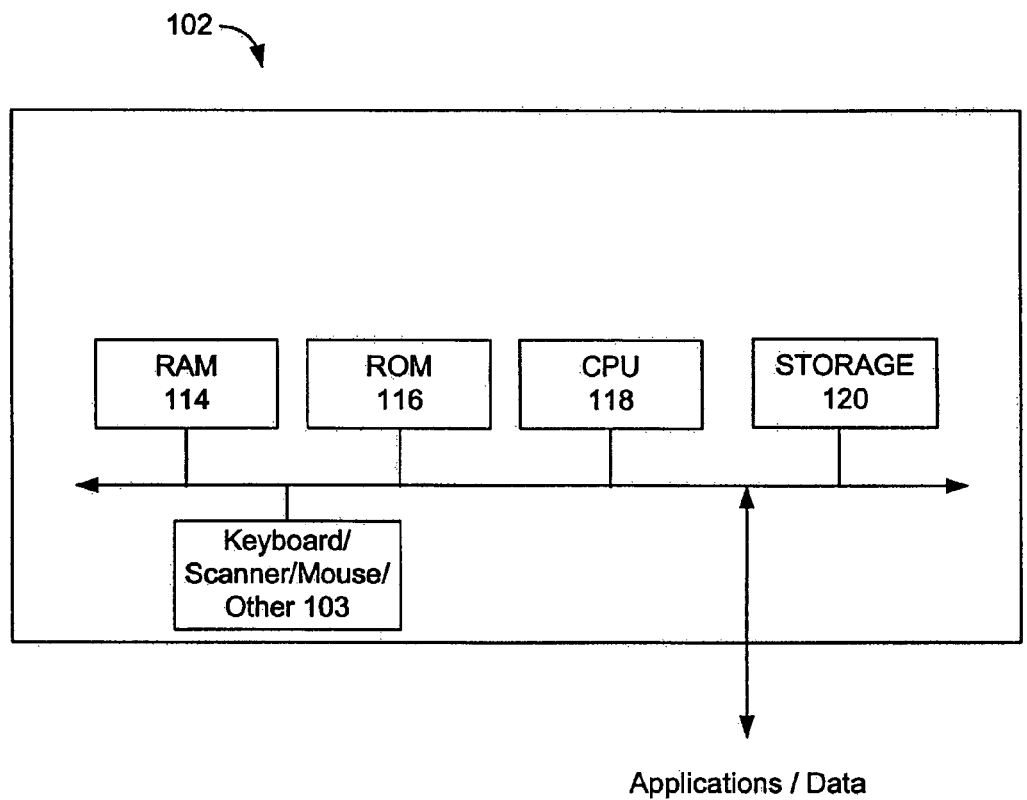
FIG. 2 is a schematic diagram of a conventional PC or other computing apparatus in which the present invention can be deployed.

In line with conventional computer software and hardware practice, a software application configured in accordance with the invention can operate within, e.g., a PC 102 like that shown in FIG. 2, in which program instructions can be read from CD ROM 116, magnetic disk or other storage 120 and loaded into RAM 114 for execution by CPU 118. Data can be input into the system via any known device or means, including a conventional keyboard, scanner, mouse or other elements 103.

Having described a typical environment in which the invention may be implemented, the following discussion describes methods, structures and systems in accordance with the invention for detecting (scanning for) and removing spyware in such a manner that does not substantially interfere with a user's ability to continue to employ the "desktop" and other aspects of the computing environment. It will be understood by those skilled in the art that the below-described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing means and computational means described below and recited in the claims may therefore be implemented in the software and/or hardware elements of a properly configured digital processing device or network of devices.

Figure 3:
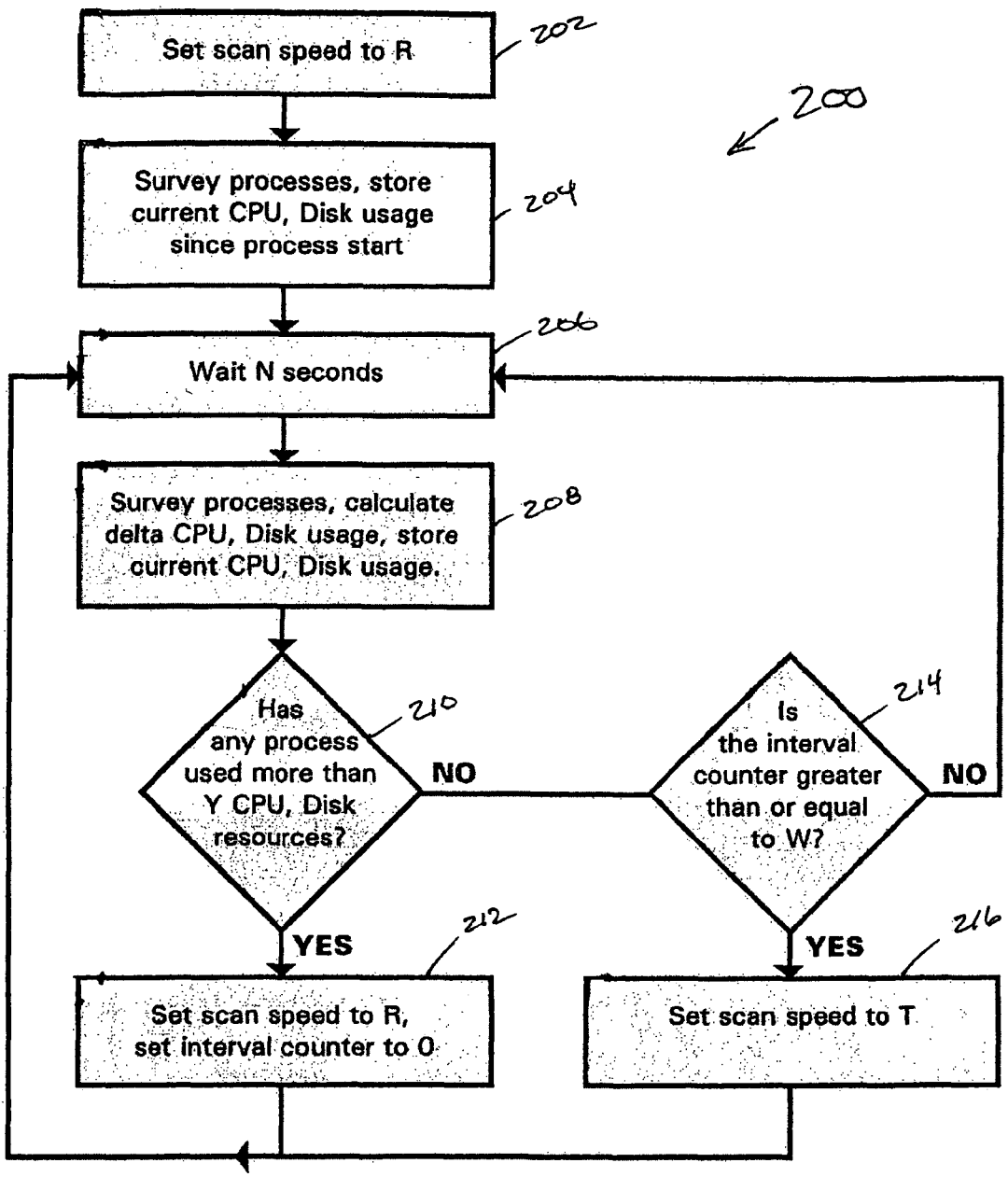
FIG. 3 is a flowchart depicting method aspects in accordance with one practice of the present invention.

Referring now to FIG. 3, there is shown a flowchart depicting method aspects 200 of the invention. In particular, the following example illustrates such a method. The parameters of the example are summarized in Table 1.

TABLE 1

Parameter Summary

| | |
|---|---|
| N | Process resource survey interval, in seconds |
| Y | Delta usage of computer resources - central processor time & disk usage |
| R | Reduced spyware scanning rate - check a registry item or file every R seconds. |
| W | The number of survey intervals where Y computer usage does not occur |
| T | Top speed scanning rate - as fast as the product can scan |

The anti-spyware product starts a scan, either network administrator initiated or based upon a scheduled time, at a scan speed of R at 202. R is the rate whereby system components are checked for the presence of spyware. R is chosen so that the user of the PC notices no degradation in application responsiveness.

All running processes are surveyed at 204 in order to establish the amount of system resources used since the process started and a snapshot of the amount of processor time and disk activity used by each process is saved. After N seconds (206), the process is repeated and a "delta" between the two snapshots is calculated (208). N is a parameter that ranges from fractions of a second to a number of seconds. At 210, if an individual process delta usage is above Y seconds then the scan starts at the rate of R as per 212. Y is a parameter that ranges from fractions of a second to multiple seconds. Every N seconds this survey is repeated and the number of intervals is counted. If the Y threshold is not reached for N*W intervals (214) then the new scanning rate is increased to T (216). In one embodiment, the method returns to 206 and repeats the cycle. The scanning rate remains at T until the threshold of Y is reached on a subsequent process survey (210, 212). As the user application usage increases or remains relatively constant the scanning mechanism throttles itself to a rate of R. When the user application usage decreases or stops the scanning rate is increased to T.

In an actual work environment, for example, a user may briefly step away from the PC to conduct a discussion with a colleague. The anti-spyware product, which had already started a scan at a rate of R, notices that computer usage has ceased and increases it scanning rate to T while the user is briefly away from the PC. At a rate of T, the entire scanning process is measured in minutes, so a five minute conversation is a large of amount of time where the scanning was conducted at a rate of T, with no impact to the user at all.

Those skilled in the art will understand that all resource usage calculations are made without including the very small overhead of the resources used to conduct the survey. The amount of resources used for the survey is insignificant and does not impact the user in any way.

Typical minimum requirements for modulated scanning and cleaning in accordance with one aspect of the invention may be a Pentium class CPU having a processor speed of about 200 MHz and 64 MB of random access memory.

It is to be understood that the invention described herein is amenable to a wide range of variations, modifications and alternative constructions and implementations. It should therefore also be understood that there is no intention to limit the invention to the specific implementations described herein. On the contrary, the invention is intended to cover all modifications, alternative implementations and equivalents falling within the scope and spirit of the invention as defined by the claims appended below.

We claim:

1. A method of scanning for spyware on a computer, the method comprising:
   setting a first scan rate for scanning for spyware;
   surveying processes executing on the computer at said first rate, thereby creating a first CPU usage value and a first disk usage value;
   repeating said surveying of processes, thereby creating a second CPU value and a second disk usage value, incrementing a counter each time said surveying is performed;
   calculating a difference between the first CPU and disk usage values and the second CPU and disk usage values;
   continuing said scanning of processes at the first scan rate if said difference is greater than a predetermined threshold; and
   if the predetermined threshold is not exceeded for a specific time period, increasing the first scan to a second scan rate.

2. A method as recited in claim 1 wherein said specific time period is the product of the predetermined time and the counter.

3. A method as recited in claim 2 further comprising:
   decreasing the second scan rate to the first scan rate when said difference is greater than the predetermined threshold.

4. A method as recited in claim 1 wherein the first scan rate will not degrade performance on the computer if performed during normal computer usage and the second scan rate will likely degrade performance on the computer if performed during a third CPU usage.

5. A method as recited in claim 1 further comprising:
   storing the first CPU usage value and the second CPU usage value in a memory in the computer.

6. A method as recited in claim 1 wherein said scanning initiates from one of an administrator command or at a scheduled time.

7. A method of scanning for spyware on a computing device, the method comprising:
   performing a first survey at a first scan rate of an executing process to determine a first CPU usage time used by the executing process;
   performing a second survey at the first scan rate of the executing process to determine a second CPU usage time;
   calculating a difference between the first CPU usage time and the second CPU usage time;
   comparing the difference with a threshold difference value; and adjusting the first scan rate to a second scan rate if the difference does not exceed the threshold difference value for a specific amount of time; and if the difference exceeds the threshold difference value, adjusting the second scan rate to the first scan rate.

8. A method as recited in claim 7 further comprising:

waiting a predetermined time between the first survey and the second survey.

9. A method as recited in claim 8 wherein adjusting the first scan rate to a second scan rate further comprises:

calculating the product of the predetermined time and a specific number of scans performed.

10. A method as recited in claim 7 further comprising:

storing the first CPU usage time and the second CPU usage time in a memory in the computer.

\* \* \* \* \*